Dec. 22, 1953      F. SEBOK      2,663,582
CLAMP ARRANGEMENT FOR CONNECTING TUBULAR MEMBERS
Filed March 31, 1949      2 Sheets-Sheet 1
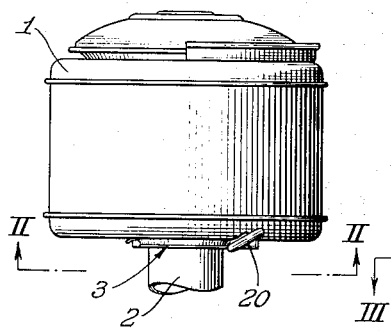
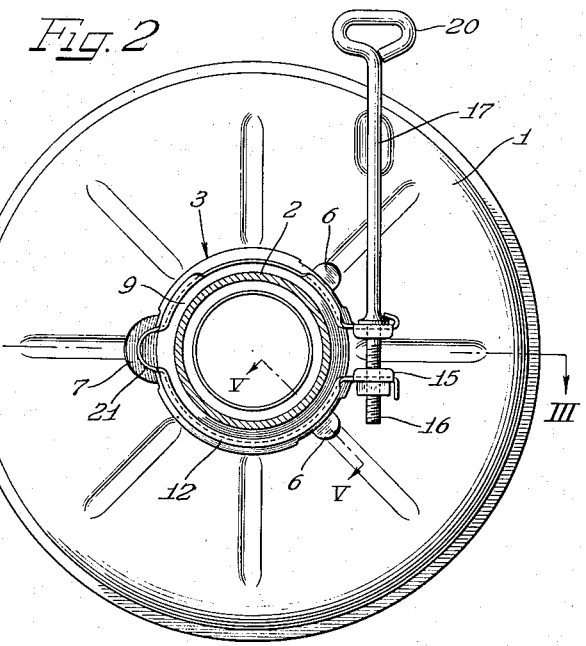
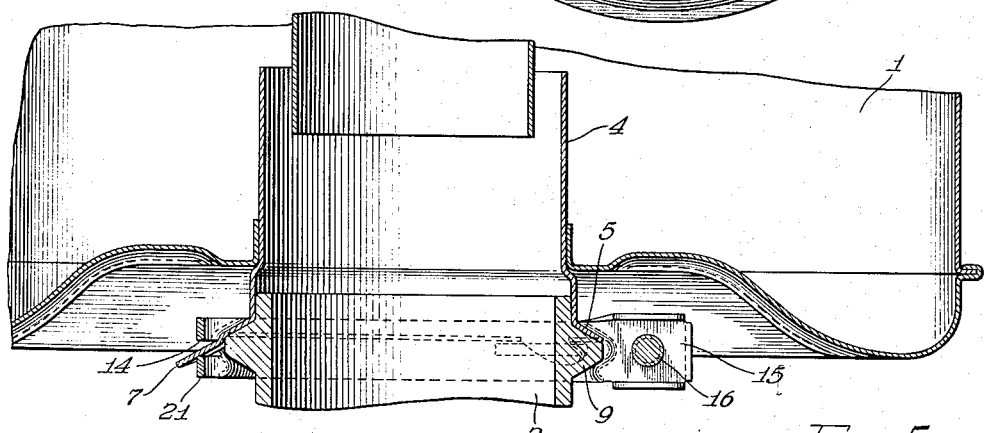
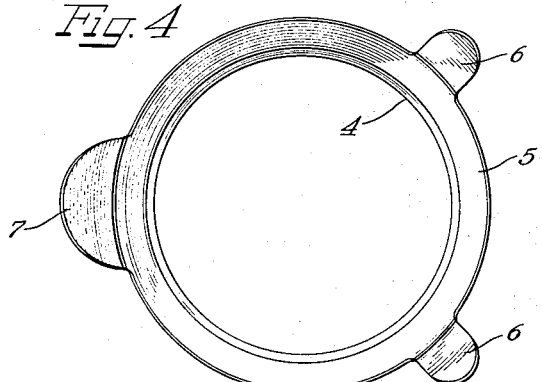
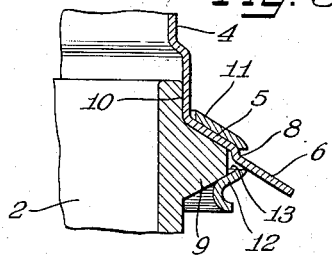
Inventor
Frank Sebok Dec. 22, 1953  F. SEBOK  2,663,582
CLAMP ARRANGEMENT FOR CONNECTING TUBULAR MEMBERS
Filed March 31, 1949  2 Sheets-Sheet 2
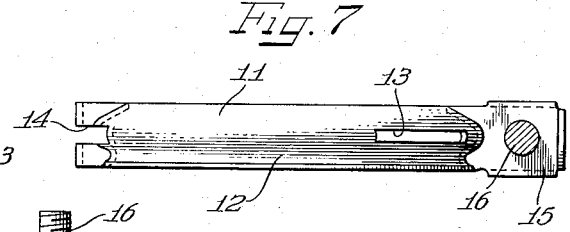
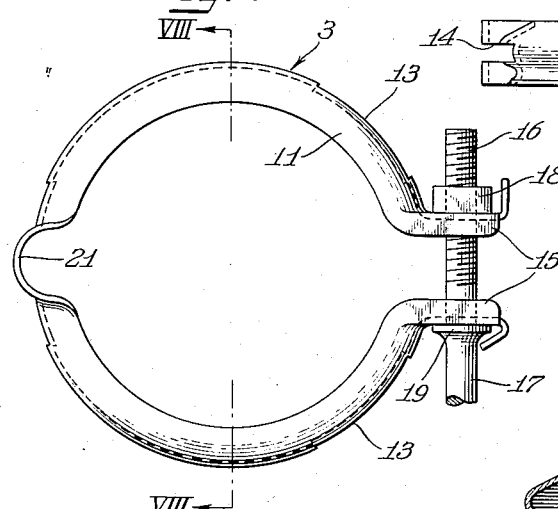
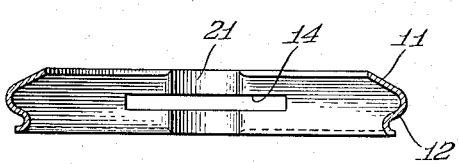
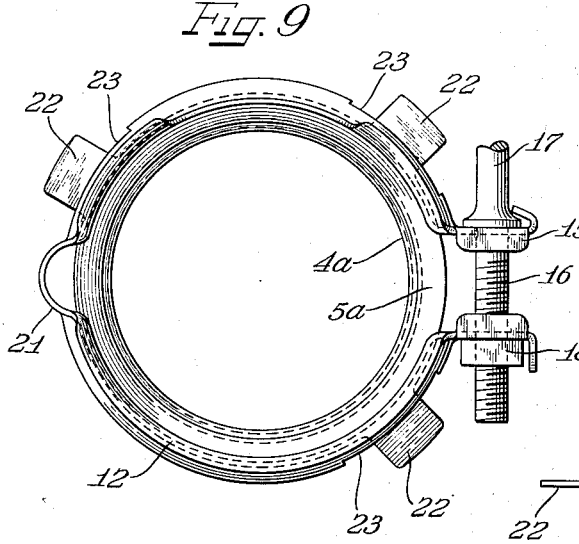
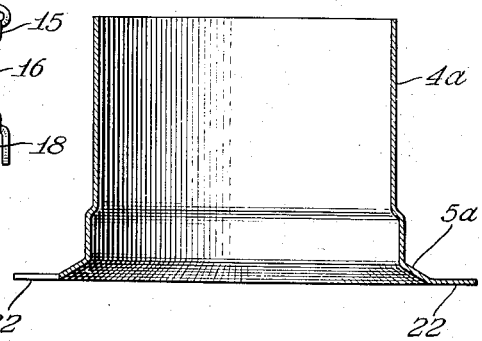
Inventor
Frank Sebok
Attys Patented Dec. 22, 1953

2,663,582

UNITED STATES PATENT OFFICE 2,663,582

CLAMP ARRANGEMENT FOR CONNECTING TUBULAR MEMBERS

Frank Sebok, Detroit, Mich., assignor to Houdaille-Hershey Corporation, Detroit, Mich., a corporation of Michigan Application March 31, 1949, Serial No. 84,537

3 Claims. (Cl. 285—129)

This invention relates to improvements in a clamp arrangement for connecting tubular members, and particularly tubular members having flanges adjacent or at their ends, the invention being highly desirable for use in coupling an air cleaner to a carburetor intake horn, although it will obviously have other and further uses and purposes as will be apparent to one skilled in the art.

In the past, many and various types of clamps have been developed for joining together flanged tubular members to form liquid or fluid type coupling between the members, and many of these clamps were of the so-called camming type which, upon being tightened, tend to cam or draw the tubular members together. Freedom of access, ease of performance, and particularly economy of manufacture were not usually present in clamps of this type heretofore known. In many instances, and this is especially true wherein an air cleaner of the so-called hat type is secured to the horn of a downdraft carburetor, the clamp must remain in position both when tightened and when loosened, the securing means for tightening the clamp must remain in the same relative location at all times, and the clamp must be prevented from riding up a flange of one of the tubular members whereupon even though the clamp were tightened to the greatest possible extent, the coupling of the members would be insecure by virtue of the clamp being out of position relatively to one of those members.

With the foregoing in mind, it is an important object of this invention to provide a clamp for coupling tubular members together, which clamp may be readily snapped on projections carried by one of the members and left in that position substantially throughout its life.

A further object of the invention is the provision of a clamp arrangement for coupling a pair of flanged tubular members wherein an expansible and contractible coupling member is engaged with means carried by one of the tubular members so that the coupling member is always held in proper position for clamping the members together and is prevented from rotating relatively to the member with which it is engaged.

It is also a feature of this invention to provide a clamp arrangement including a clamping element having one or more slots therein through which a projection or projections carried by one of the members with which the clamp is associated may project, thus maintaining the clamp element in proper position for use at all times and eliminating probability of loss or misplacement of the element when not in use.

A further object of the invention is the provision of a clamp arrangement wherein an expansible and contractible clamp element is supported on one of the members to be connected by it by means carried by that member extending directly through the clamp element, such support being of a loose nature to permit free expansion and contraction of the clamp element, and the clamp element itself being shaped to provide added resiliency in at least one region to permit the element to be originally snapped in position over the projecting means during assembly.

While some of the more salient features, characteristics and advantages of the instant invention have been above pointed out, others will become apparent from the following disclosures, taken in conjunction with the accompanying drawings, in which—

Figure 1 is a fragmentary elevational view of a combination air cleaner and intake silencer connected with the intake horn of a carburetor by means embodying principles of the instant invention;

Figure 2 is a plan sectional view of the structure of Fig. 1 taken substantially as indicated by the line II—II, looking in the direction of the arrows, and illustrating the clamp arrangement in bottom plan;

Figure 3 is an enlarged fragmentary vertical sectional view taken substantially as indicated by the line III—III of Fig. 2;

Figure 4 is a bottom plan view of the outlet tube or sleeve of the air cleaner and silencer construction;

Figure 5 is an enlarged fragmentary vertical sectional view through the clamp arrangement in operative position, this view being similar in character to Fig. 3, but taken in a different location through the clamp;

Figure 6 is a top plan view of the clamp element alone;

Figure 7 is a side elevational view of the structure of Fig. 6, showing the securing element in section;

Figure 8 is a vertical sectional view taken substantially as indicated by the line VIII—VIII of Fig. 6;

Figure 9 is a fragmentary bottom plan view of a clamp arrangement embodying principles of this invention but of slightly different construction; and Figure 10 is a vertical sectional view of the air cleaner outlet tube or sleeve seen in Fig. 9.

As shown on the drawings:

While the instant invention is shown in association with an air cleaner and carburetor intake horn to illustrate the operation of the invention, it will be understood that the clamp arrangement may be utilized in many other locations and for many other purposes.

With reference now to Figs. 1 to 8 inclusive, it will be seen that by way of an example a combination air cleaner and intake silencer 1 is coupled or connected to a carburetor intake horn 2 by means of an expansible and contractible clamp element generally indicated by numeral 3.

As seen best in Fig. 3, the air cleaner 1 is provided with an outlet sleeve or tube 4 having an outwardly and downwardly sloping flange 5 at its lower end. One or more lugs or tongues may project outwardly from the flange 5. In the illustrated instance there are three such lugs shown, two of similar size and shape designated by numeral 6, and a larger one indicated by numeral 7. As illustrated best in Fig. 5, each of the lugs or tongues 6 and 7 are preferably stepped downwardly at their connection with the flange 5 substantially the thickness of the metal as indicated at 8 so as not to interfere with an accurate fit between the flange 5 and the adjacent part of the carburetor intake horn 2, as will more fully later appear herein.

The carburetor horn is provided with an outer annular flange 9 having tapering walls, the flange being generally the shape of a blunted V in cross section, apex outermost. This flange is spaced slightly below the mouth of the horn 2 so as to permit a telescopic engagement between the outlet sleeve 4 and the horn, as indicated at 10 in Fig. 5, before the flange 5 on the outlet sleeve comes to rest upon the upper face of the horn flange 9. The sleeve 4 and horn 2 may be held tightly connected together by means of the clamp ring 3.

This clamping ring is generally of channel shape in cross section, the channel being generally of a V shape with a rounded apex, so that the ring includes an upper and inwardly sloping portion 11 for confronting engagement with the flange 5 on the air cleaner outlet 4, and a lower, downwardly and inwardly sloping portion 12 for engagement with the underface of the flange 9 on the intake horn. As seen best in Figs. 7 and 8, the clamp ring is provided with a pair of slots 13—13 to accommodate the lugs or tongues 6—6 on the outlet sleeve 4 and another and larger slot 14 to accommodate the larger tongue 7.

As seen best in Fig. 6, the ends of the clamp ring are turned outwardly into spaced confronting relationship as indicated at 15 and through these end portions the threaded shank 16 of a securing bolt 17 extends. On the outside of one end portion a nut 18 may be secured in any desirable manner, and outside the other end portion the bolt is preferably shouldered as at 19. Referring to Fig. 2 it will be seen that the outer end of the bolt may be shaped in the form of a loop or eye as indicated at 20 to facilitate manipulation of it. Preferably directly opposite the outwardly turned ends 15—15, the clamp ring is shaped to eliminate the channel formation thereof and provide a vertical formation 21 to function as a hinge and permit the ring to be expanded considerably prior to the application of the bolt 17 so that it may be engaged over the lugs or tongues 6 and 7 on the outlet sleeve 4 when the structure is initially assembled. After the placing of the bolt 7, the clamping ring will not then slide off the tongues 6 and 7 as long as the threaded shank of the bolt is engaged with the nut 18. Thus, even when the air cleaner is removed from the intake horn, the clamp ring 3 remains attached to the lower end of the outlet sleeve 4.

By virtue of the fact that the slot 14 is located partially through the hinge portion 21, this slot must of necessity be somewhat wider than the slots 13—13 in order to prevent binding on the tongue 7, because as seen in Fig. 3 the part 21 will be spaced away from intimate contact with the flanges 5 and 9.

With this construction, it will be noted that the clamp ring is always held in proper position to be tightened into positive engagement with the parts to be joined. When tightened, the sloping portions 11 and 12 of the clamp ring acting upon the sloping faces of the flanges 5 and 9 will tend to cam the outlet sleeve 4 and the air horn 2 together to insure a fluid-tight fit therebetween. If the tubular members 4 and 2 are properly seated, the clamp ring may be immediately tightened without any particular attention, and by virtue of its engagement over the tongues 6 and 7 it will not tend to ride up the lower face of the flange 9 so as to wholly or partially engage the portion of maximum diameter of this flange and thus provide an insecure connection. On the other hand the clamp will positively engage the respective parts as shown in Figs. 3 and 5. At the same time, the tongues 6 and 7 prevent the clamp ring from turning relatively to the sleeve 4 so that the bolt 17 is always located in the same position relatively to the air cleaner. By virtue of its being carried on the sleeve 4 the clamp ring will never be mislaid or lost when the sleeve is separated from the horn 2. Thus the simple construction of the tongues on one tubular member and the slots in the clamp ring performs a triple function, and such clamp arrangement does not require the addition of any initially separate parts to a portion of the structure and the provision of the tongues and slots adds only a negligible amount to the cost of manufacture.

In Figs. 9 and 10 I have illustrated a similar clamp arrangement, wherein a tubular element 4a is provided with an outwardly and downwardly sloping flange 5a and projecting from and integral with this flange is a plurality of spaced tongues 22, each of the same size and shape. In this instance, however, the tongues 22 project horizontally and do not follow the slope of the flange 5a as was the case with the above described tongues. The clamp ring is of the same general construction as above described, with the exception that there is no slot through the hinge portion 21, and slots 23 of identical character may be provided to accommodate the tongues 22. The operation of the structure of Figs. 9 and 10 is substantially the same as above described in connection with Figs. 1 to 8 inclusive. The showing of Figs. 9 and 10 indicates, however, that there may be a variance in the disposition of the tongues and slots without adversely affecting the operation of the clamp arrangement.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a clamp arrangement, a tubular member, a downwardly and outwardly inclined flange on the end of said member, spaced tongues on said flange extending therebeyond, an open-ended clamp ring of channel shape and of the expansible and contractible type, said clamp ring having slots in the base of the channel through which said tongues project to retain the clamp ring on the tubular member even when the ring is loose and expanded and to prevent rotation of the ring relatively to the flange, adjustable means connected to the ends of the ring to selectively expand or contract the ring, and said tongues holding the ring outwardly to insure engagement of the ring with a flange of another member.

2. In a clamp arrangement, a tubular member, a downwardly and outwardly inclined flange on the end of said member, spaced tongues on said flange extending therebeyond, an open-ended clamp ring of channel shape and of the expansible and contractible type, said clamp ring having slots in the base of the channel through which said tongues project to retain the clamp ring on the tubular member even when the ring is loose and expanded and to prevent rotation of the ring relatively to the flange, adjustable means connected to the ends of the ring to selectively expand or contract the ring, and said tongues holding the ring outwardly to insure engagement of the ring with a flange of another member, said tongues being offset in stepped fashion substantially the thickness of the flange at their point of engagement with the flange to insure accurate engagement of the clamp ring.

3. In a clamp arrangement a tubular member, a downwardly and outwardly inclined flange on the end of said member, spaced tongues on said flange extending therebeyond, an open-ended clamp ring of channel shape and of the expansible and contractible type, said clamp ring having slots in the base of the channel through which said tongues project to retain the clamp ring on the tubular member even when the ring is loose and expanded and to prevent rotation of the ring relatively to the flange, adjustable means connected to the ends of the ring to selectively expand or contract the ring, and said tongues holding the ring outwardly to insure engagement of the ring with a flange of another member, one of said tongues being wider than the others, and said clamp ring having a wider slot opposite its ends to receive said wider tongue, said ring having an outwardly bowed cylindrical wall portion in the region of said wider slot.

FRANK SEBOK.

References Cited in the file of this patent

UNITED STATES PATENTS

| Number | Name | Date |
|---|---|---|
| 904,200 | Harris | Nov. 17, 1908 |
| 1,148,041 | Minkler | July 27, 1915 |
| 1,335,521 | Murphy | Mar. 30, 1920 |
| 1,457,155 | Fey | May 29, 1923 |
| 1,681,150 | Vischer | Aug. 14, 1928 |
| 1,726,837 | Jording | Sept. 3, 1929 |
| 2,080,988 | Schulz | May 18, 1937 |
| 2,269,664 | Hallerberg | Jan. 13, 1942 |
| 2,351,484 | Carpenter | June 13, 1944 |
| 2,356,333 | Matter | Aug. 22, 1944 |
| 2,403,606 | Meyer | July 9, 1946 |
| 2,512,741 | Goodall | June 27, 1950 |